(12) United States Patent  
Cozza

(10) Patent No.: US 8,317,451 B2  
(45) Date of Patent: Nov. 27, 2012

(54) LIFTING SYSTEM FOR DISPLAY CASES

(76) Inventor: Frank Charles Cozza, Lakeside, CA (US)

( * ) Notice: Subject to any disclaimer, the term of this patent is extended or adjusted under 35 U.S.C. 154(b) by 594 days.

(21) Appl. No.: 11/704,474

(22) Filed: Feb. 8, 2007

(65) Prior Publication Data

US 2007/0194546 A1 Aug. 23, 2007

Related U.S. Application Data

(60) Provisional application No. 60/771,985, filed on Feb. 9, 2006.

(51) Int. Cl.  
*B60P 1/02* (2006.01)
(52) U.S. Cl. ......... 414/458; 414/450; 414/490; 414/621
(58) Field of Classification Search .................. 414/444, 414/450, 453, 454, 458, 490, 621  
See application file for complete search history.

(56) References Cited

U.S. PATENT DOCUMENTS

| | | | | |
|---|---|---|---|---|
| 1,018,260 A * | 2/1912 | Myrholm | ...................... | 414/621 |
| 2,821,317 A * | 1/1958 | Locke | ........................... | 414/621 |
| 3,768,954 A * | 10/1973 | Marsh et al. | .................. | 425/451 |
| 4,090,628 A * | 5/1978 | Sinclair | ......................... | 414/623 |
| 4,934,893 A * | 6/1990 | Johnson | ........................ | 414/458 |
| 5,379,814 A * | 1/1995 | Posly | ............................. | 141/351 |
| 5,716,186 A * | 2/1998 | Jensen et al. | .................. | 414/458 |
| 5,823,737 A * | 10/1998 | Cook | ............................. | 414/621 |
| 6,095,537 A * | 8/2000 | Cozza et al. | ............... | 280/79.11 |
| 7,311,487 B1 * | 12/2007 | Crossley et al. | ......... | 414/331.06 |
| 7,328,907 B1 * | 2/2008 | Bileth | ........................ | 280/79.11 |
| 7,438,301 B2 * | 10/2008 | Schilling et al. | ............. | 280/79.7 |
| 2007/0014654 A1 * | 1/2007 | Haverfield et al. | ........... | 414/621 |

FOREIGN PATENT DOCUMENTS

GB 2032385 A * 5/1980 .................... 414/621

* cited by examiner

*Primary Examiner* — James Keenan  
(74) *Attorney, Agent, or Firm* — Donn K. Harms

(57) ABSTRACT

A lifting system for shelves and store gondolas which provides for a gripping engagement of the upright posts of the frame of the shelving which supports the load on engaged shelves and products. The device features a dolly and extending members having an opening on distal ends to grip the post. Tapers on the members provide for deflection of any kickplates present. The dollies may be employed in a plurality around the shelf and engaged with connector bars between them for a unified movement of the dollies elevating the shelf.

26 Claims, 12 Drawing Sheets

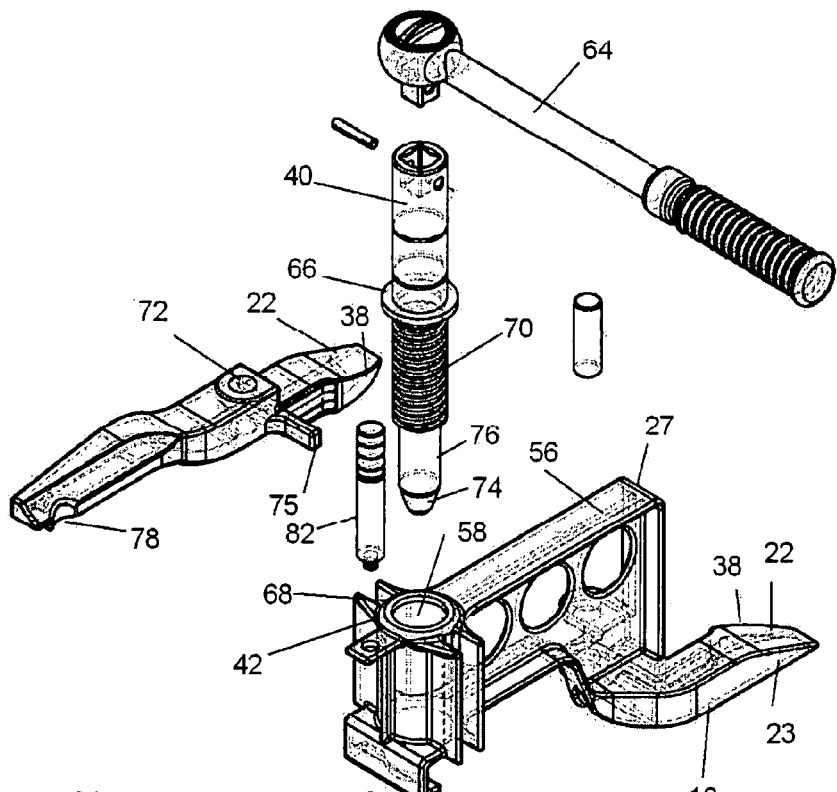
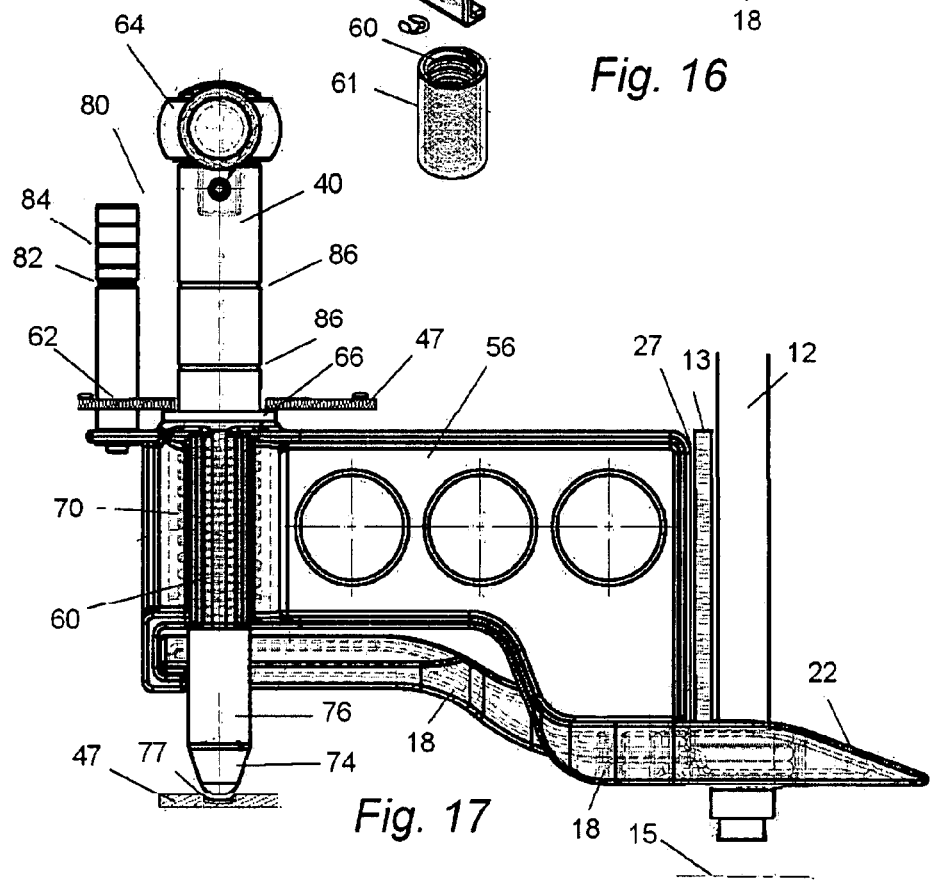
Fig. 16
Fig. 17

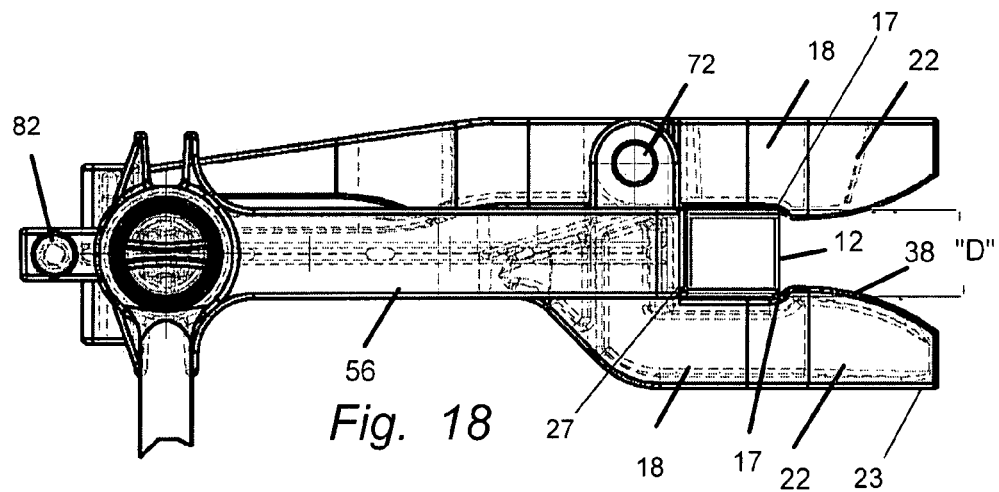
Fig. 18
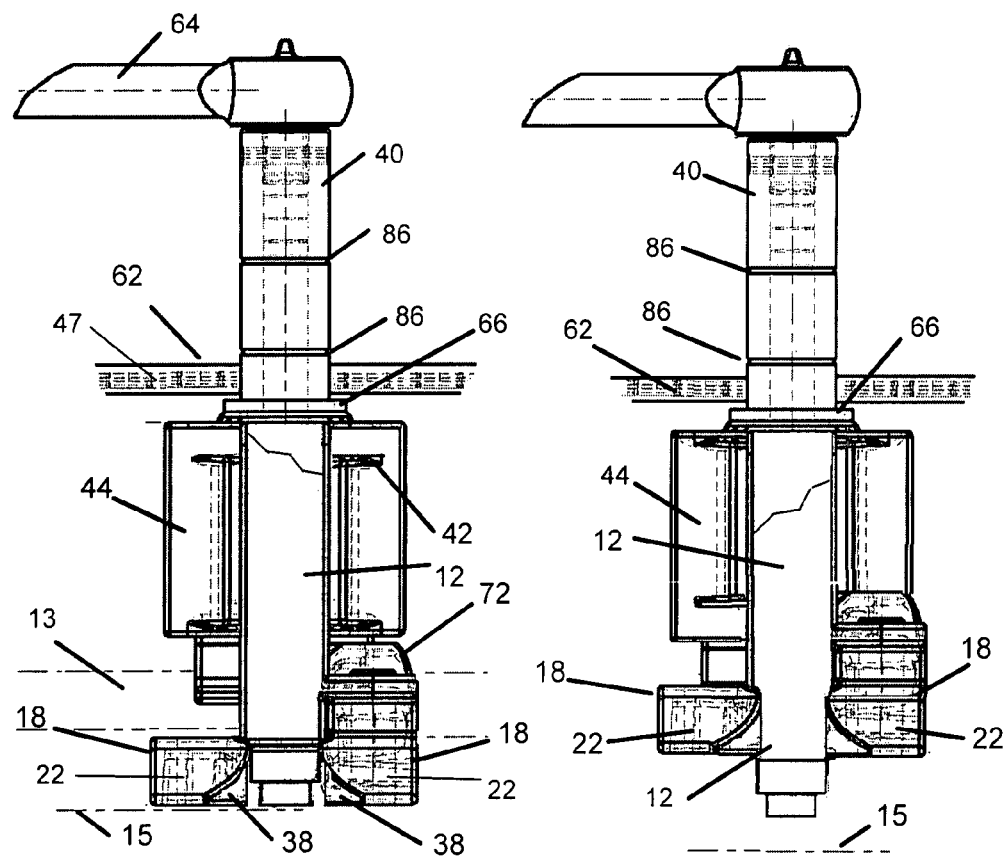
Fig. 19
Fig. 20

LIFTING SYSTEM FOR DISPLAY CASES

This application claims priority from U.S. Provisional Patent Application Ser. No. 60/771,985 filed Feb. 9, 2006.

BACKGROUND OF THE INVENTION

1. Field of the Invention

The present invention relates to dollies and lifting components. More particularly, it relates to dollies employed in the moving of large storage and display structures such as retail store display cases commonly known as gondolas, file cabinets, shelving, and other such storage and display components, which employ a system of legs for support on a floor surface.

2. Prior Art

Storage and display shelving and cases are an everyday fact of life in a modern society. Because floor space in most retail stores, storage warehouses, and office buildings is at such a premium, the display and storage of merchandise, the storage of files and records, along with storage of an infinite number of other items, has progressed upward. In order to conserve floor space in retail and commercial situations and to provide better viewing and access to products, shelving is commonly employed to hold products. In a retail setting such shelving is generally arranged to form aisles for customers to traverse through adjacent shelve structures. In a commercial or warehouse setting, a similar aisle configuration is conventionally employed. The shelves in this configuration give the customers and users a much better view of the products being stored. Further, holding capacity of the products in a finite floor space is greatly increased by vertical stacking above a small footprint on the floor.

In warehouses where goods and products are stored for distribution or shipping, shelving is also employed to increase the storage capacity in the given floor space and to organize the inventory. Offices also use shelving to hold records and to display goods as well as employing leg-supported file cabinets to organize and hold volumes of files.

All such shelving and cabinets, whether in retail stores, warehouses, or offices, must be structurally able to support the load intended. This structural support, being generally metal, makes the shelving heavy. A vexing problem of such shelving, by nature of its need to support a load, is the elevated weight rendering the shelves ungainly. This is especially true when such shelving is loaded with heavy products for sale such as canned goods in a supermarket. The elevated inventory can increase the total weight of the shelf supporting it to a multiple many times that of the shelf itself.

A variety of jacks and dollies have been introduced in the past, most of which pertain to the lifting of such cabinets which employ vertical support legs with an adjustable leveling foot extending from a bottom end and employed to level the shelves. However, most conventional products used for the purpose fail to provide a unified system of components, to lift, move, and subsequently re-place the shelf in position. Instead, conventional systems employ various jacks, forklifts and such for the purpose. This results in much time wasted and often damaged shelving from the ill-designed devices employed.

This is especially true when the moving of shelves is required during the remodeling or renovation of retail stores such as grocery stores, drug stores and the like. During such a remodeling process, it is often necessary to move large display cases, conventionally known as gondolas, which hold everything from tooth paste to canned soup. Moving them generally requires repositioning the shelves or gondolas from one part of the store to another. Often during a store remodeling process, the shelves will need to be moved multiple times to allow for various phases of construction and repositioning of merchandise to new locations.

As noted, such display cases or gondolas are large, heavy, and have extending shelves which hold and display a very large number of small products for sale. The placement of heavy products in an elevated position from the floor also makes the shelves ungainly and predisposed to tip when elevated with products remaining on the shelves. However, with the cost of labor and time involved, removing and replacing the products each time the display case is to be relocated can be especially expensive and can also play havoc with the short time schedules allotted for the remodeling process to minimize lost sales. As such, the ability to move display cases and other heavy storage devices while fully loaded with products or other stored items is highly desirable.

In some instances shorter and smaller loaded display cases might be relocated with any suitable lifting apparatus, such as conventional fork lifts or floor jacks which place them on conventional flat surfaced dollies for transport. However, most display cases such as those in grocery store aisles are very long and not suited for this type of movement. Further, as is normal in retail sales establishments, the display cases are connected together in long sets to form the aisles in the store. Consequently, transport by floor jack or flat dollies is not an option. Further, because storage and display properties of such display cases generally yield shelves very close to opposing shelves on the same display aisle, frequently there is insufficient room in the aisle formed between adjacent display cases for entry of a fork lift or large flat surfaced dolly.

Additionally, while small dollies have been manufactured to engage with portions of the underlying support structure of the shelves, the ever-widening variety and construction of such support structures has made it hard to employ small dollies which will accommodate the width and legs of different types of supports.

As such, there is a continuing unmet need for an improved device and system of inter-working components and a method that provides for easy, quick, and safe movement of large heavily loaded display cases and gondolas. Such a system should be easily adapted to the job at hand and type of shelving and supports involved. Still further, such a system should be safe to use for workers and should curtail accidents by preventing tipping of the heavy shelves when lifted.

SUMMARY OF THE INVENTION

The device and method herein disclosed and described achieves the above-mentioned goals through the provision of an adaptive lifting system that allows for a gripping engagement of the upright posts of the frame of the shelving which supports the load on engaged shelves and products. Such vertically disposed support posts are generally hidden from view behind a kick plate which extends between the lowest shelf of the shelf structure and the floor supporting it. This kick plate blocks viewing of the floor and distal ends of the support posts for aesthetic reasons. Some shelves and gondolas have an open area exposing the support posts, but most have this kickplate that must be accommodated.

The device and method herein is especially adapted for lifting and movement of such shelves by employing a plurality of small wheeled dollies. The dollies have at least two wheels or skids or other means to support the load to be lifted by the dolly, and to roll in the direction steered by the user depending on the direction of force exerted by the user.

The dollies are especially well adapted to the task at hand in that each provides a compressive and frictionally engaging means to grip the support posts of the shelf. Such an engaging means in the current preferred modes of the device is provided by opposing members adapted to engage the support post with sufficient opposing compressive force to lift the support post from the ground once engaged. This engaging means is also calibrated to prevent crushing and deformation of the support post during this process which is extremely important.

In one mode of the device, the members grasping the support post are closed by a handle and cam arrangement configuring the shape of the inside surface of both opposing members to match the post configuration. A hand-operated handle thrusts a sliding beam toward a cam which forces the opposing members closed only a distance sufficient to grip but not deform the support post. In a particularly preferred mode of the device, the grasping members are forced toward each other at respective distal ends by the tapered distal end of a threaded rotating member engaged with a lifting carriage. This taper which is most preferred provides for a release from contact with the members for engagement to the post, and a progressive closing of the members to a locked engagement to the posts. However, other means to bias the opposing members together with sufficient force to allow lifting of the compressibly engaged support member are anticipated.

The dolly, once the support members are engaged, has an onboard means to elevate the opposing members once engaged on the support member which provides sufficient mechanical advantage to make elevation of the support post and its connected section of the shelving relatively easy for the user. Further provided is a locking means preventing the release of the opposing members grip upon the elevated support member any time it is elevated from the floor to thereby prevent accidental release during use. Only when the opposing members gripping the upright support post are lowered to a position adjacent to the floor are the opposing members released from their engagement to the support post.

Also provided with the system is a means to momentarily elevate the kickplate extending between the floor and bottom-most shelf which blocks access to the support posts of most conventional gondolas and shelving employed in stores such as Walmart and other local and national stores. In the current preferred mode of the device, this means to deflect or elevate the kickplate or fascia component is provided by a tapered top surface at the distal end on both opposing members which when moved toward the support member with sufficient force will cause the kickplate to deflect and rise sufficiently in an elevated position to provide access to the support post by the opposing members. An angled surface provides a footplate for engagement of the user's foot with the dolly on the opposite side of the opposing members to force the dolly forward. An engageable handle also provides a means to concurrently allow the user to use his arms with the one foot on the angled surface forming the footplate to exert an increased forward force upon the engaged dolly. Using his foot and hands makes it relatively easy for the user to move the opposing members forward with sufficient force to deform the kick plate in the area of the shelf or gondola where the support post is located during initial engagement of the opposing members around the support post.

Another component employed in one preferred mode of the device features a means to prevent engagement of the setting component to the dolly, unless two opposing members are lowered to a position substantially adjacent to the floor or support surface for the support post. This is accomplished currently by a pin and socket arrangement between the setting component and the dolly that prevents engagement if the opposing members of the dolly are not substantially lowered to the floor. It prevents damage to the shelving and kickplate from a user who might try to force the dolly forward when the opposing members are too high from the ground. Another preferred mode of the device allows for freewheeling or play of the distal ends of the opposing members when adjacent to the floor.

Also provided on the preferred modes of the device disclosed is a means to spread the opposing members during engagement to the support post. In the preferred modes of the device, this is a valued function since as noted below, an aperture formed between the opposing members engages two opposing sides of the support post, and when closed, wraps around two outside corners of the support post to allow engagement of the corners and one side of the post that is traverse to the two opposing parallel sides. In order for the opposing members to encircle the support post in such a fashion, the opposing members must be spread on initial contact with the support post. Currently a tapered leading inside edge of both the opposing members communicating with the engagement aperture formed therebetween provides this function. When forced forward in the aforementioned fashion, the opposing members will momentarily spread apart through contact of the inside edge with the support post and then move back to a neutral position once the support post is encircled by the aperture.

As noted, the dolly also has an onboard means to elevate the opposing members. Once the support post is engaged between the opposing members, the elevation means provides sufficient mechanical advantage to make elevation of the support post relatively easy for the user. Currently a screw or threaded member adapted for engagement to an external tool through the top surface of the dolly provides for the lifting capability. When the threads forming the screw are rotated in a threaded engagement with a sliding lift chassis engaging the opposing members, a lifting of the support post is elevated. Twisting the adjustment screw raises the chassis and the opposing members engaged with the support member and thus the gondola shelf. The adjustment provides an interlock to bias the opposing members closed. Once interlocked, the opposing members are locked in place such that they will not release their grip on the raised support post while it is elevated. This is an important feature especially when the device is used with unskilled labor or employees who do not use the equipment much to insure their safety. Other means to lock the opposing members on the support post could be used and are anticipated; however, the current disclosed embodiments work well since they are passive and do not require the user to actually take the step of locking the opposing members as it is automatic.

The wheels supporting the dolly are preferably casters which are fully swiveling and each dolly has at least two caster style wheel assemblies with each caster sized in accordance with the load to be supported. Additional support to prevent forward rotation of the dolly when so engaged is provided by an elongated face or surface support having a surface adapted for engagement against the exterior surface of the support post or the kickplate or fascia (if present) in a contact engagement. By employing this elongated face surface, additional stability is provided since the contact with the support posts provides a means to prevent rotation of the dolly forward or toward the shelf which might cause a disengagement while in use. This surface contact on one side and wraparound engagement of the support post on the other side of the support post is therefore most preferred as providing the most stability of the connection of the device to the shelf.

Generally, single wheel casters formed from a plastic material that will not mar the flooring are effective. However, where a very heavy load is to be moved, a wider caster wheel is preferred which distributes the load over a larger wheel/floor contact surface to prevent marring the floor.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of this invention to provide an improved dolly system for the moving of shelving and storage racks and the like that is inherently safe to use.

It is an additional object of this invention to provide such a dolly system that also has passive locking of the dolly to the shelf when elevated to prevent accidental release.

A further object of this invention is the provision of such a dolly system that allows for a plurality of such dollies to engage a shelf at multiple points and thereafter raise the shelf for rolled movement.

These together with other objects and advantages which become subsequently apparent reside in the details of the construction and operation as more fully hereinafter described and claimed, reference being had to the accompanying drawings forming a part thereof, wherein like numerals refer to like parts throughout.

BRIEF DESCRIPTION OF DRAWING FIGURES

FIG. 16 is an exploded view of the opposing members and the rotating member having a tapered distal end and external threads forming an engageable screw with threads of the lift chassis.

FIG. 17 is a sliced view of the components of FIG. 16 operatively assembled and showing the opposing members engaged to a support post and the face abutted against the surface of the kickplate with both elevated from a supporting floor.

FIG. 18 is a top plan view of the opposing members in a wrap-around compressed frictional engagement to a support post.

FIG. 19 depicts a sectional view showing the two opposing members in their first position adjacent to the supporting floor.

FIG. 20 depicts a slice through FIG. 18 showing the opposing members in their second or elevated position in a wrap-around compressed engagement to the support post.

DETAILED DESCRIPTION OF THE PREFERRED EMBODIMENTS OF THE INVENTION

Figure 1:
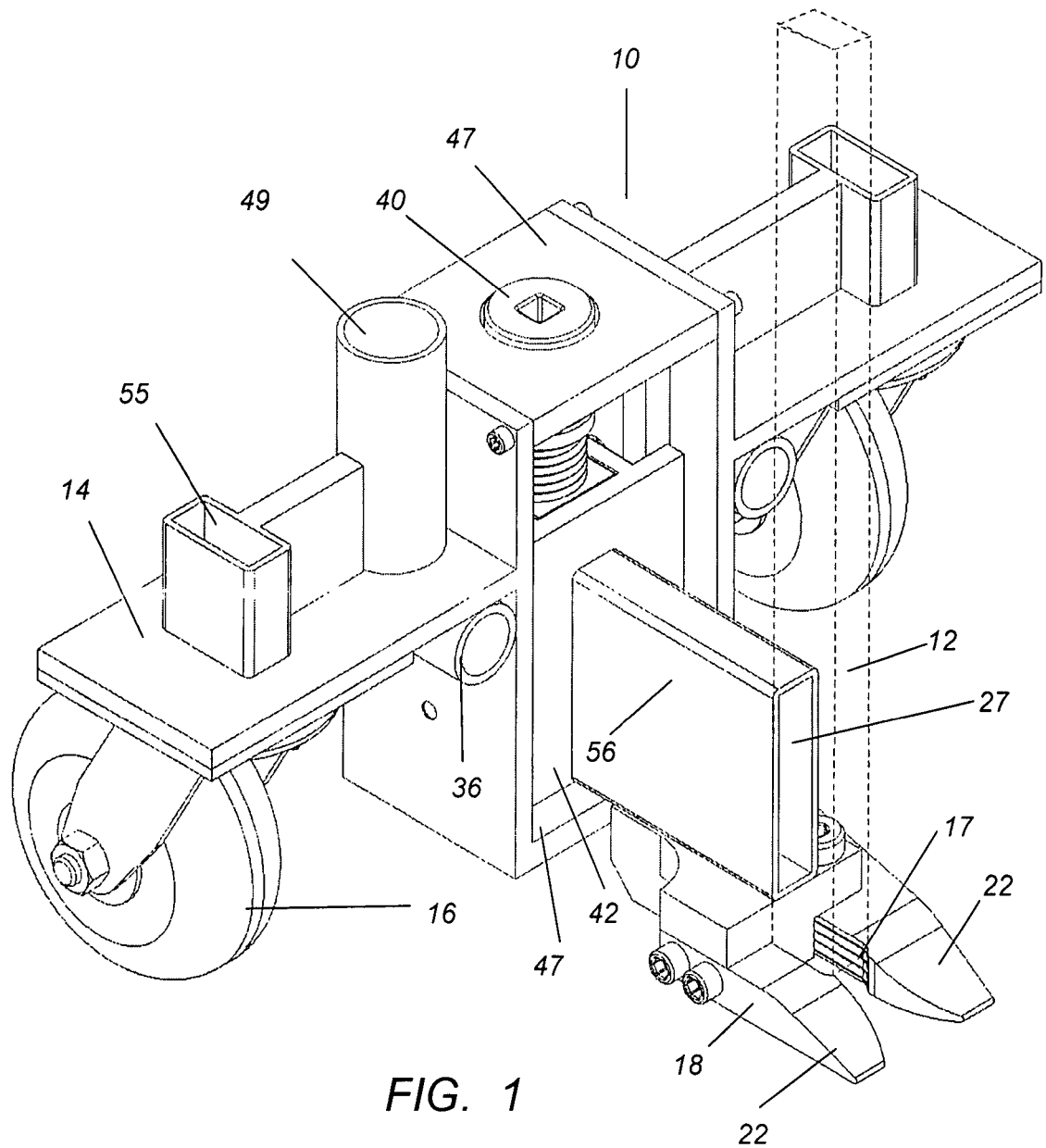
FIG. 1 depicts a perspective view of a preferred mode of the device showing the dolly from the side engaging a gondola or shelf and shows the opposing members adapted for a wrap-around frictional engagement.
Figure 2:
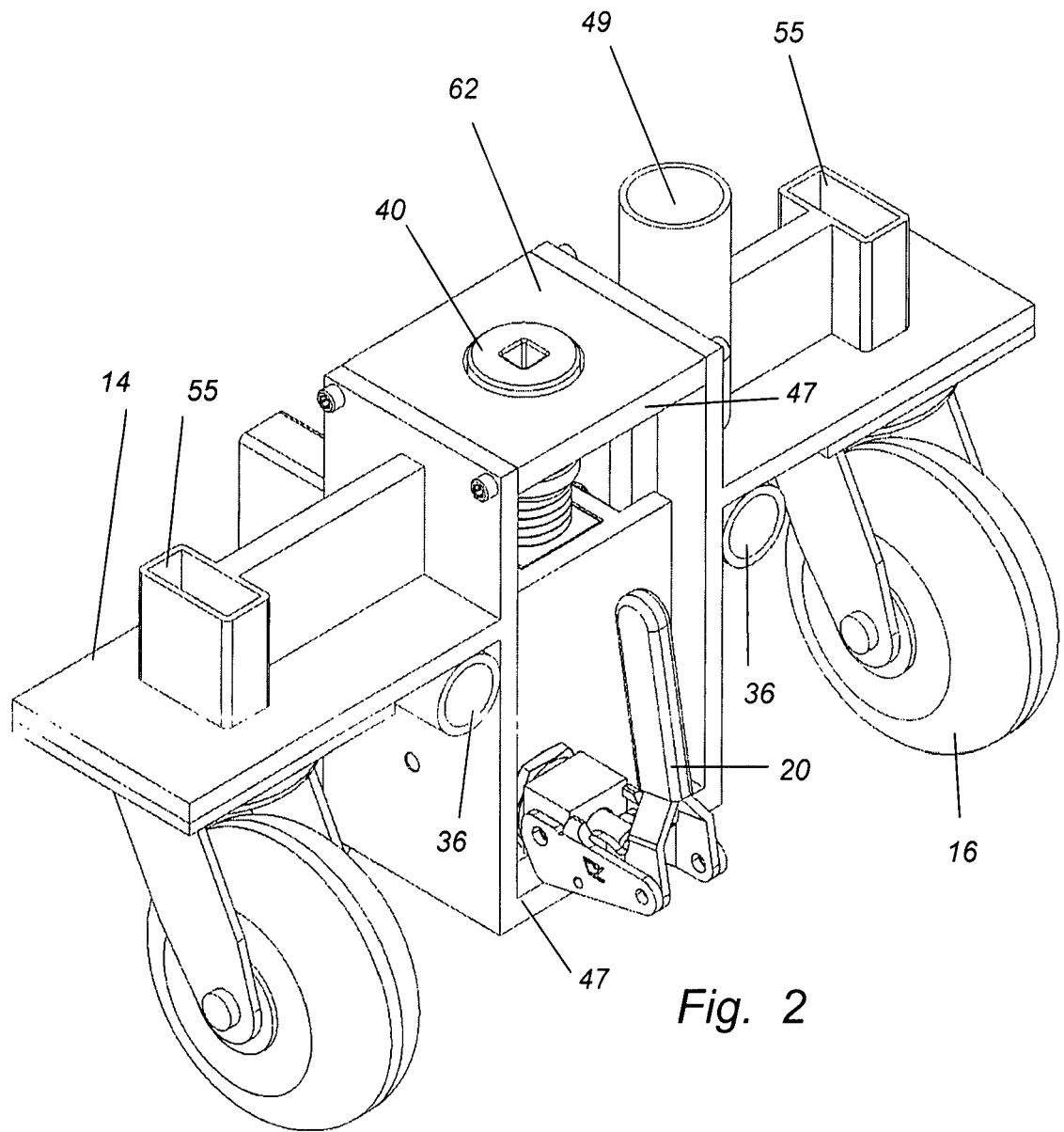
FIG. 2 is a perspective view of the dolly from the side opposite that of FIG. 1.
Figure 3:
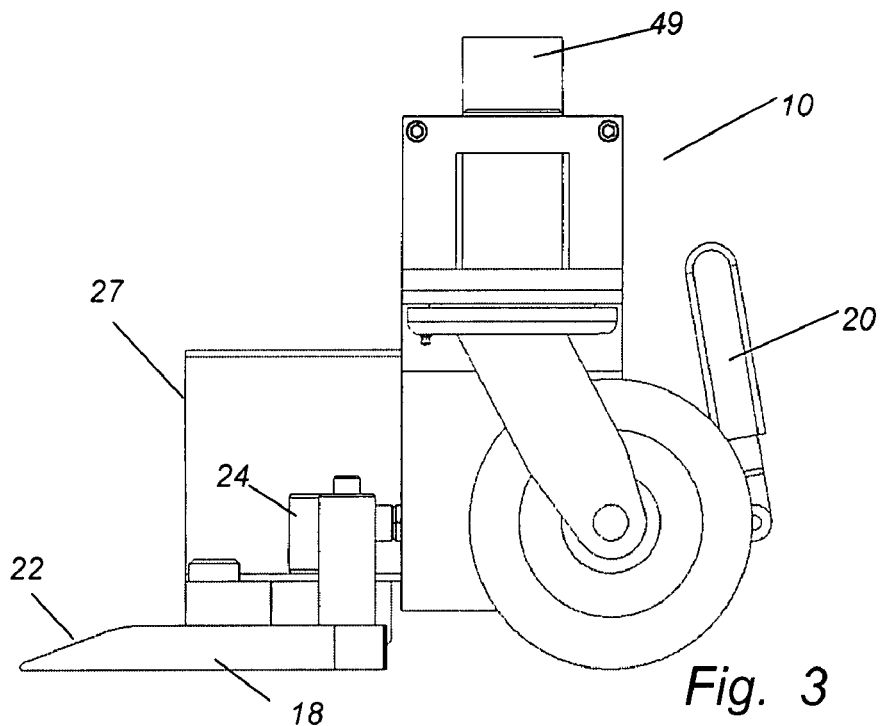
FIG. 3 shows a side view of the device and the tapered distal ends of the opposing members.
Figure 4:
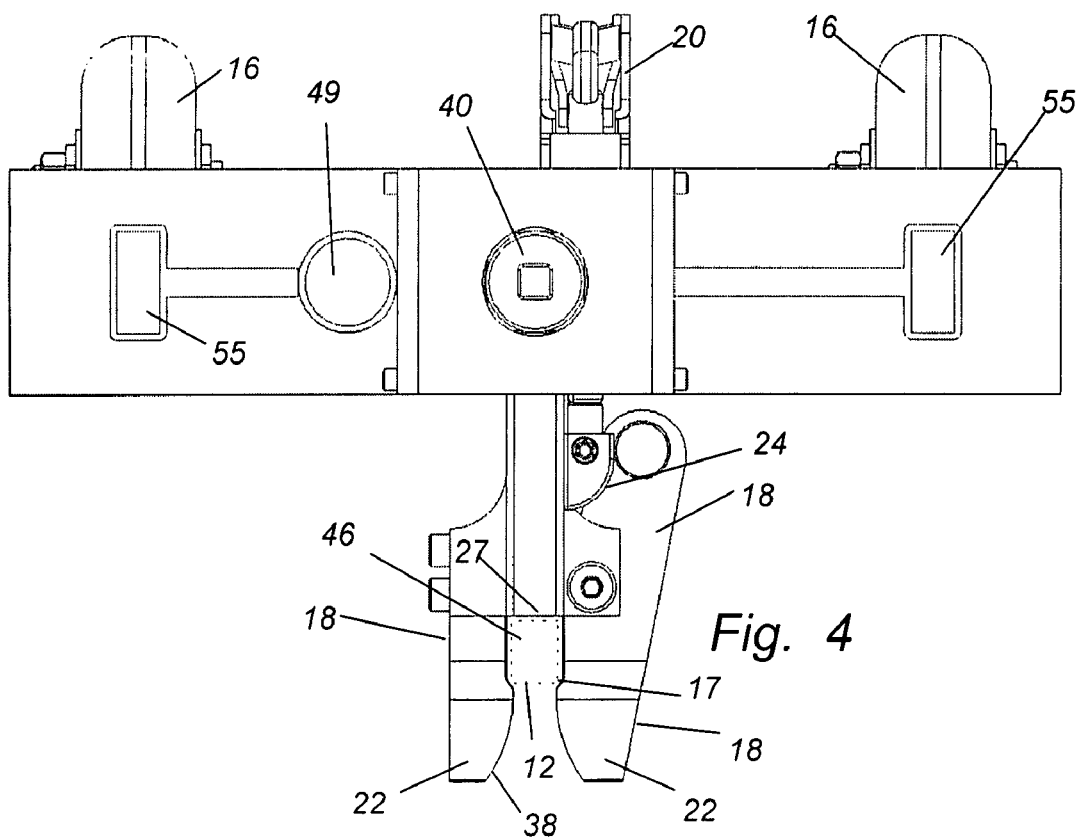
FIG. 4 is a top plan view of the device showing the adjustment screw and collar engagements for a handle and for support members that engage adjacent dollies.
Figure 5:
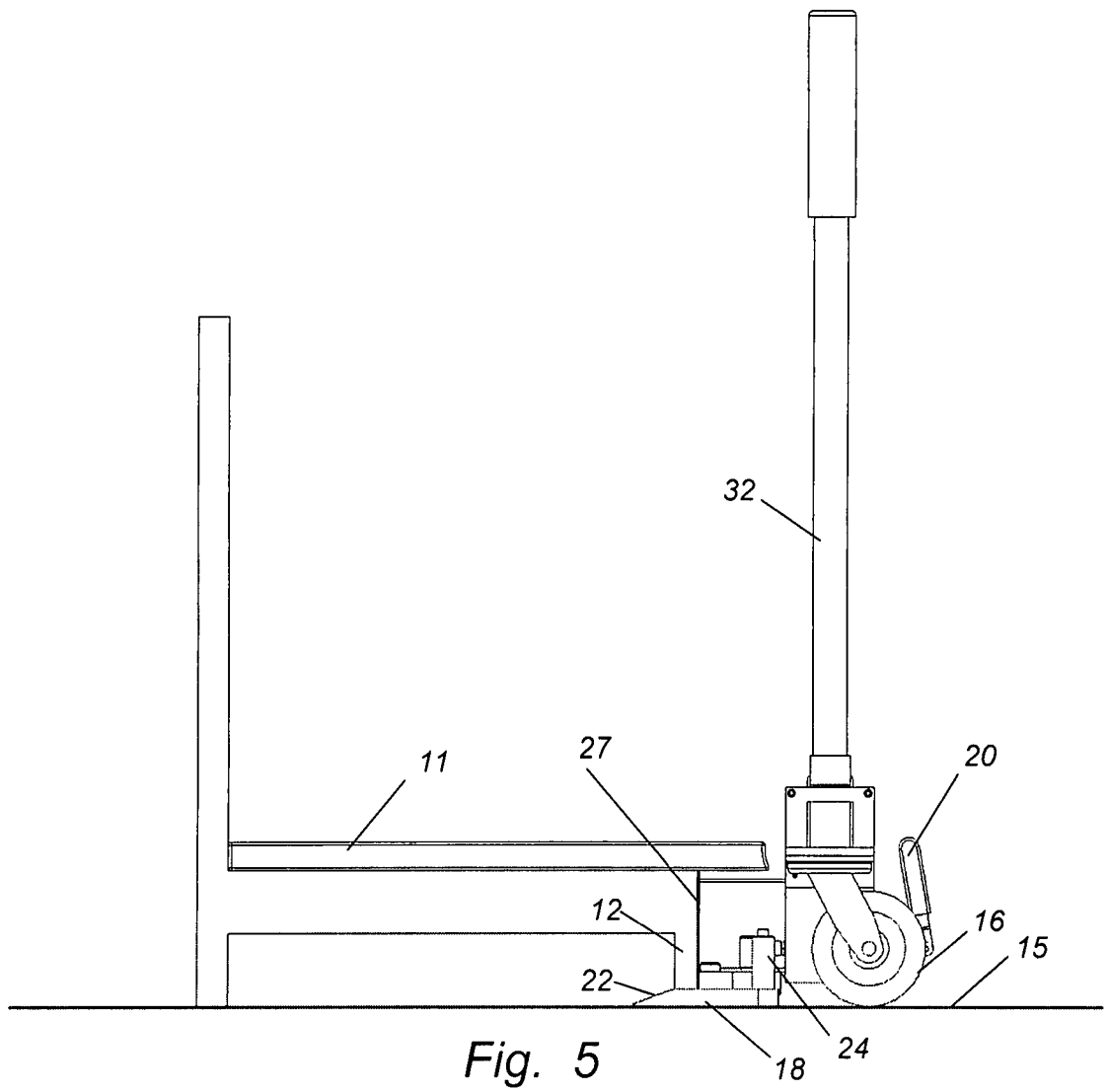
FIG. 5 depicts a side view of the device engaged around a support post of a shelf or gondola.
Figure 6:
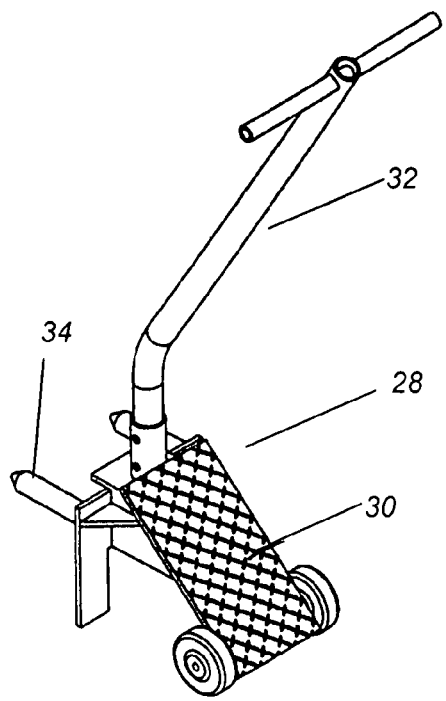
FIG. 6 shows a rear view of a setting component adapted to engage the dolly during setting of the dolly to the shelf support post and moving of the shelving when multiple dollies are attached.
Figure 7:
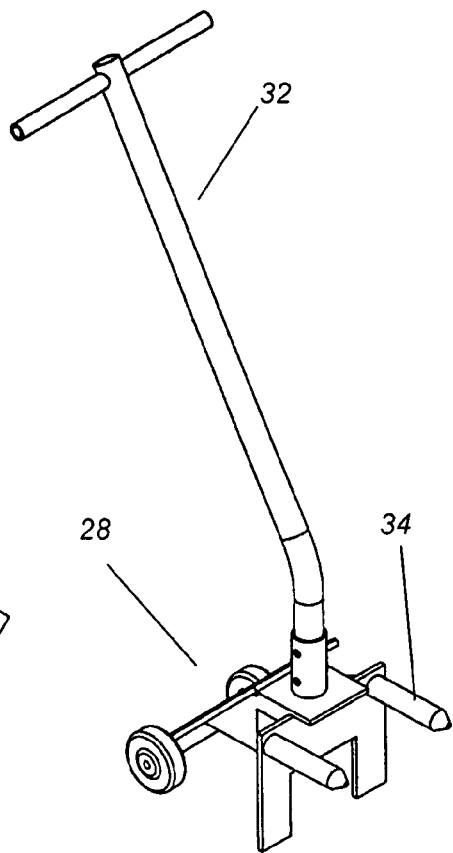
FIG. 7 shows the pins projecting from the setting component adapted to engage mating collars on the dolly.
Figure 8:
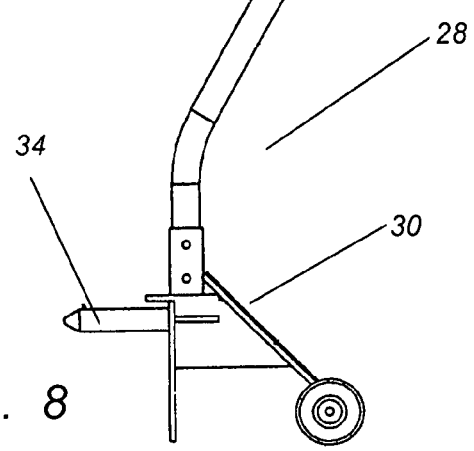
FIG. 8 depicts a side view of FIGS. 6 and 7.

Referring now to the drawings of FIGS. 1-21, the modes of the device 10 and method herein disclosed feature an easy to use component system to engage support posts 12 of conventional gondolas and shelves 11 for movement of the shelf 11 with or without the merchandise thereon. Such vertically disposed support posts 12 are generally hidden from view behind a kick plate 13 shown in FIG. 9 which extends between the lowest shelf of the structure and the floor 15 supporting it, thereby blocking access to the support post 12.

Moving such shelves 11 with the two modes of the device 10 herein entails attaching a plurality of small wheeled dollies 14 to a plurality of the support posts 12 hidden behind the kickplates 13 if they are present. Each dolly 14 has at least two wheels 16 adapted to support the shelf 11 supporting merchandise and to roll on the wheels 16 once elevated.

In all modes the dolly 14 employs means to grip the support post 12 to which it is attached which in all preferred modes of the device 10 currently employ two opposing members 18 adapted on their inner face 38 to engage the post 12 with sufficient opposing force, to be able to lift the support post 12 from the ground 15 when the opposing members are translated upward. It is important not to crush or deform the post 12 during this process.

Figure 10:
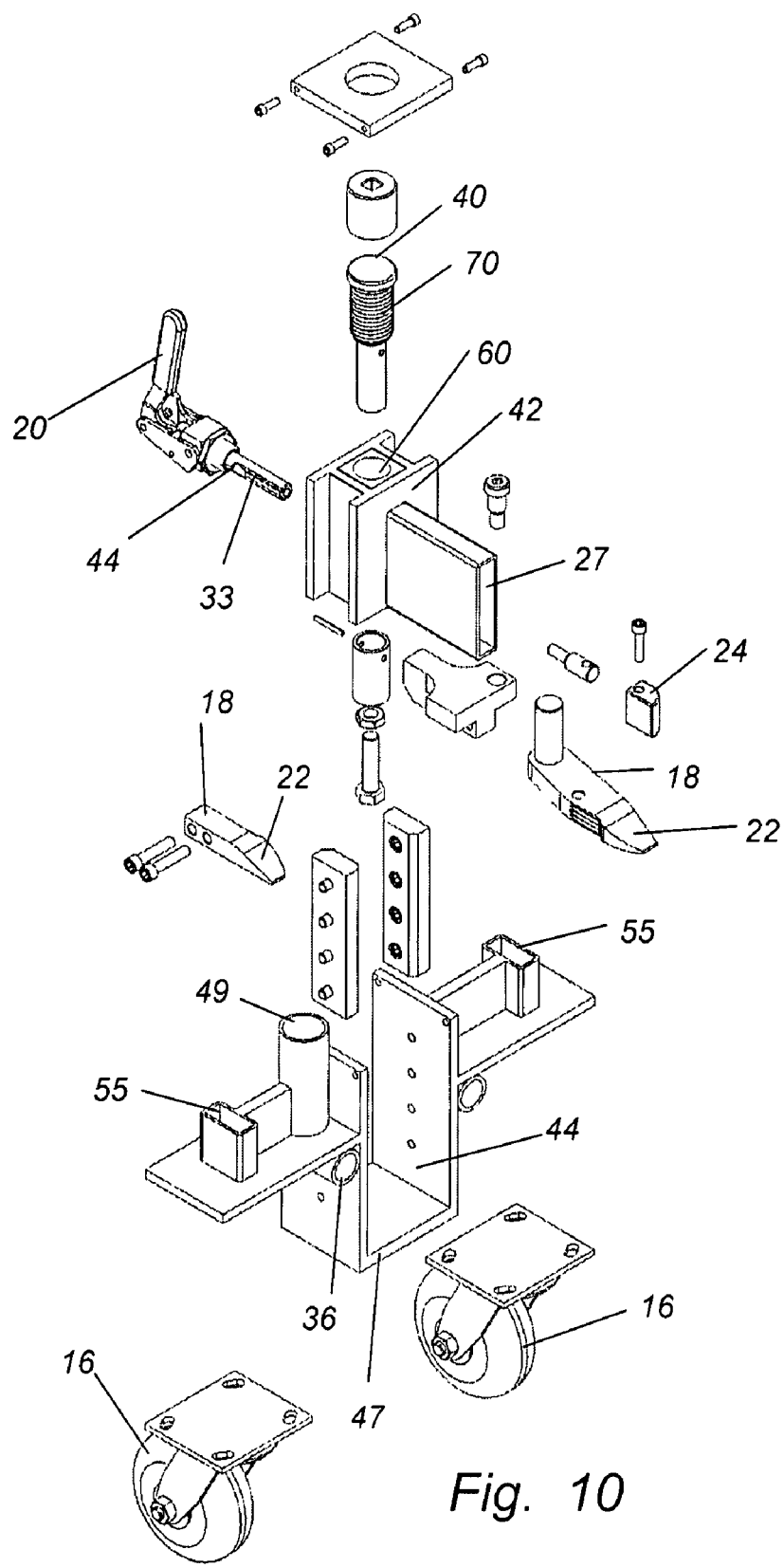
FIG. 10 is an exploded view of the dolly and engaged sliding chassis showing the sliding member and locking engagement with the adjusting screw.

One current preferred mode to impart sufficient force employs a handle 20 engaged with a cam 24 shown in FIG. 10. Raising the handle 20 in its engagement to the dolly causes a sliding member 33 to move the cam 24 to force the opposing members 18 to a closed position from an open position. The amount of forward movement of the sliding member 33 and shape of the cam 24 determine the ultimate force placed on the post 12 in conjunction with the shape and size of an aperture 46 formed in the inner face 38 of the opposing members 18. As can be seen in FIG. 10, changes in this geometry can change the force imparted and such can be easily adapted to different sized posts. Another particularly preferred means to bias the opposing members 18 together with sufficient force to allow lifting of the post 12 are shown in FIGS. 16-20 and described below. As noted below, this mode allows for freewheeling of the members 18 in the lower position and a tapered surface forcing the members 18 closed and locked. Of course other means to force the opposing members 18 toward each other as would occur to those skilled in the art are anticipated.

As shown in a first preferred mode of the device 10 in FIGS. 1-10, a dolly mounted means to elevate the opposing members 18 and hence the support post 12 once it is engaged, is provided by a screw 40 which is adapted for engagement and rotation by an external tool through the top surface of dolly 14. The screw 40 is rotated in its threaded engagement with a sliding lift chassis 42 to which the opposing members 18 are engaged. Of course the opposing members 18 can be removably engaged to allow differently configured members 18 adapted to different sized and shaped support posts 12 to be easily attached and used with the device 10 rendering it very adaptable to any situation.

Rotating the adjustment screw 40 raises the lift chassis 42 portion of the device translationally engaged in the slot 44 of the dolly 14 and thereby raises the opposing members 18 which are frictionally engaged in a compressed attachment with the support post 12. This allows the shelf 11 to be lifted at each support post 12 easily. In the first preferred mode of the device 10 of FIG. 10, the adjustment screw 40 is adapted to interlock with a slot 44 formed in the sliding beam 33. Once interlocked by raising the handle 20 to close the opposing members 18, the sliding beam 33 is locked in place to hold the opposing members 18 which then cannot lose their grip on the raised support post 12 while it is elevated. The especially preferred mode of the device 10 of FIGS. 11-20 provide a similar means to lock the opposing members 18 as described below. Of course other means to lock the opposing members 18 on the support post 12 and prevent their disengagement therefrom during elevation of the support post 12 could be used and are anticipated. However, the current disclosed means for locking the opposing members 18 is especially preferred since it does not require the user to actually take an active step of locking the opposing members 18 because locking occurs automatically by translation of the screw 40 against the member 18.

Also provided with both modes of the device 10 is a means to momentarily elevate the kickplate 13 which as noted conventionally blocks the view of, and therefor access to, the support posts 12. In both current preferred modes of the device 10 this means to deflect or elevate the kickplate 13 or fascia component is provided by tapered top surfaces 22 at both distal ends of the opposing members 18 which will elevate the kickplate 13 sufficiently when forced thereunder thereby providing access to the support post 12.

Additionally provided in the first mode of the device 10 is a removable setting component 28 which is adapted to releasably engage with the dolly 14 along a side edge opposite of the opposing members 18. The removable setting component 28 provides a means to concurrently allow the user to use their arms and one foot to exert the forward force upon the engaged dolly 14 during mounting and during movement of the shelf or gondola increasing their ability to exert force thereon during the move. The setting component 28 features an angled foot plate 30 adapted to allow the user to push on it with one foot, and a "T" shaped handle 32 that is engageable to the setting component 28 and allows the user to concurrently push with their hands on the setting component 28 along with their foot. In the single piece mode of FIGS. 11-20 a similar handle 32 engages with the dolly engaged collar 49 to provide force to push the members 18 under a kickplate. A similar handle 48 will engage a collar 49 on the dolly 14 in both modes of the device to provide a means to push the device 10 on the floor 15 during transport to and from the shelf 11. Generally the concurrent hand and foot pushing of the dolly 12 only occurs when setting the members 18 around a support post 12 and under a kickplate 13 if employed on the shelf 11.

In the two-piece mode of the device 10 a means to prevent engagement of the setting component 28 to the dolly 14 is provided and operates to prevent cooperative engagement unless the two opposing members 18 are lowered to a position substantially adjacent to the floor 15 or support surface for the support post 12. This is accomplished currently by a pin 34 and socket 36 arrangement between the setting component 28 and the dolly 14. With the sliding chassis 42 properly adjusted using a bottoming component the opposing members will be in their proper position at a bottom or lowest position. The sockets on the dolly will then align with the pins 34 to allow engagement. If the opposing members 18 are not properly adjusted, the engagement is misaligned.

It is preferred in all modes of the device that the aperture 46 formed on the inner face 38 of both opposing members 18 allow the face 38 at the point of the aperture 46 to engage two opposite side surfaces of the support post 12, and, provide a wrap-around 17 of the third side traverse to the first two and thereby provide a means for engagement of the opposing members around the corners of the support post 12 opposite the elongated face 27. This is shown best in FIGS. 4 and 17-20. This wrap around engagement provides a much more secure mount and prevents rotation of the dolly toward and away from its engagement with the fourth side of the support post 12 or the kickplate 13 if in place. Also preferred for the most support is elongated face 27 which is surfaced to be substantially parallel to the axis of the support post 12 and provides a flat surface for the wrap-around 17 engagement, against which to force the post 12.

Because this wrap-around engagement narrows the gap between the opposing members 18, in both modes of the device 10, at the distal ends of the members to a distance less than "D" when in the engaged position, a means to spread the opposing members during engagement to the support post 12, to distance wider than "D" is preferably provided. This too is preferably a passive component to allow for low skilled labor and is provided by a tapered leading inside edge 38 of both opposing members 18 communicating with the engagement aperture 46 formed therebetween. When forced forward in the aforementioned fashion, the opposing members 18 will naturally separate apart before moving back to a neutral position once the support post 12 is encircled by the aperture 46 on two sides and at least two corners opposite the kick plate 13. Further, on the most preferred mode of the device an extending arm 75 will contact the support post 12 when forced toward it, and close the opposing members 18 automatically.

Generally, single wheel casters formed from a plastic material that will not mar the flooring are effective for wheels 16 for all modes of the device 10. However, where a very heavy load is to be moved, a wider caster wheel is preferred, which distributes the load over a larger wheel/floor contact surface to prevent marring the floor.

Figure 9:
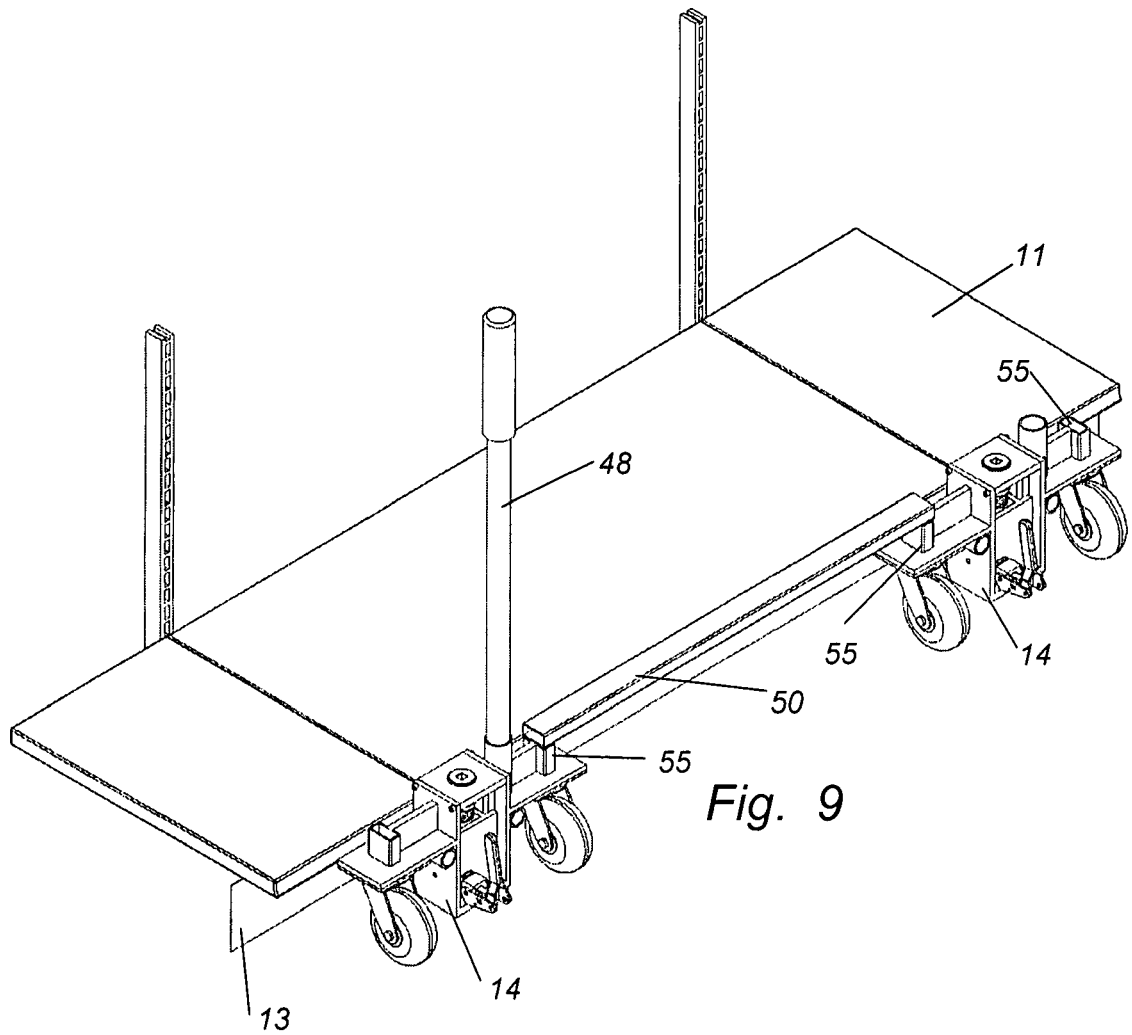
FIG. 9 shows the engagement of a plurality of dollies to a conventional shelf and the engageable support member that attaches between adjacent dollies to provide lateral support during rolling of the shelves.

In both modes of the device herein, and shown in FIG. 9, the dollies 14 are adapted to be engaged to each other at multiple support posts 12 on each gondola or shelf 11 to be moved, especially if they are loaded with merchandise. It has been found through experimentation that the addition of removably engageable members shown as connector bars 50 which are adapted on each respective end to provide a connection between each adjacent dolly 14 such as using mount 55, provide a marked increase in the stability of the devices in their engagement and in the raised shelf 11. Consequently, in all preferred modes of the device 10, connector bars 50 adapted at both ends to engage adjacent dollies 14 would be employed thereby connecting all the individual dollies 14 on each side of the shelf being moved to form a single shelf elevation unit. So engaged, the multiple dollies 14 and connector bars 50 provide a means to impart lateral support to the engaged shelf 11 and means to provide unitary movement of a plurality of shelf-engaged dollies during transit of the shelf 11.

Figure 11:
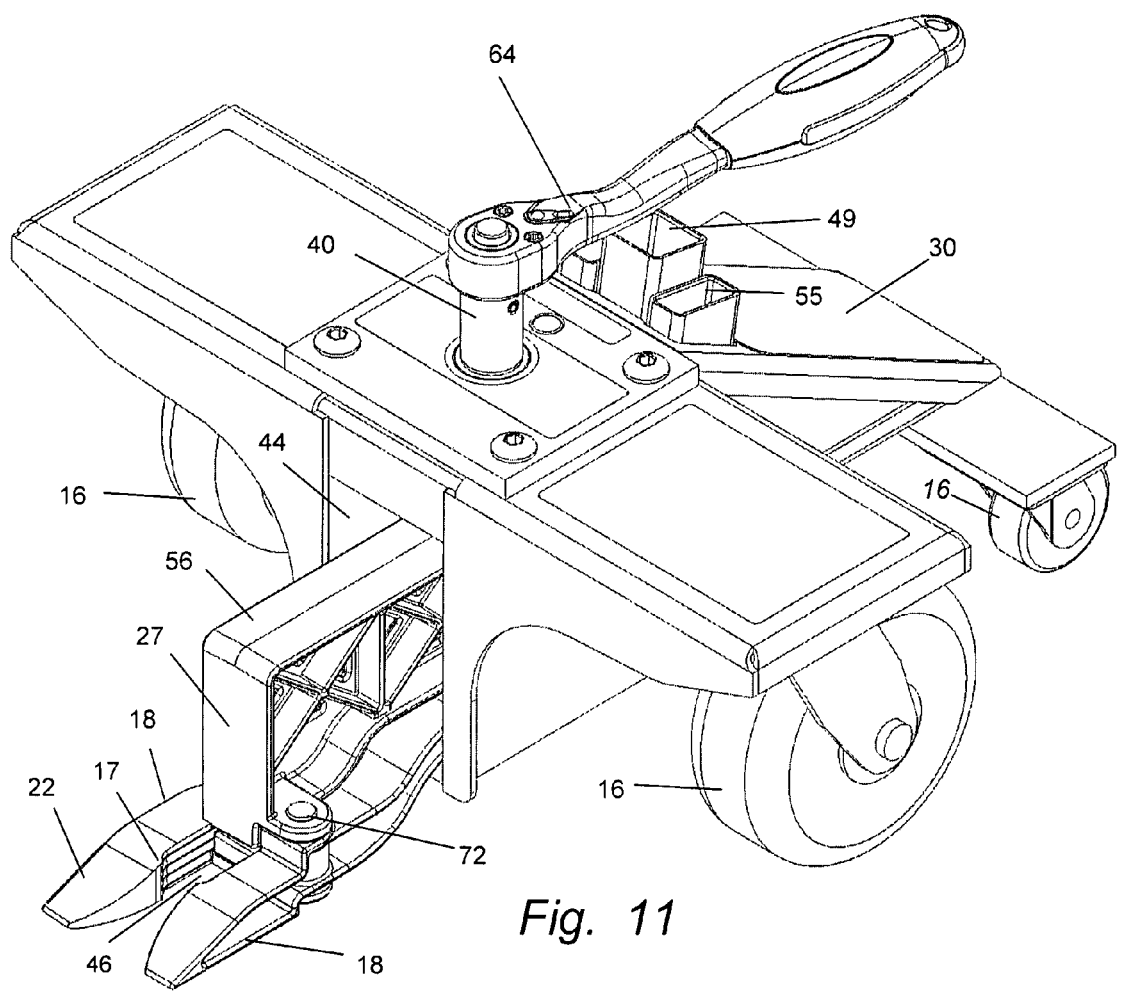
FIG. 11 is a perspective view of an especially preferred mode of the device showing a single piece unit having a footplate extending from the side opposite of the dolly from the members.
Figure 12:
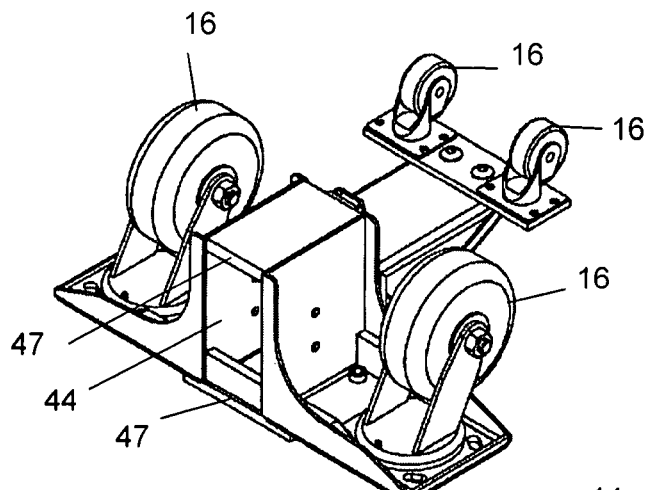
FIG. 12 is a bottom view of the embodiment of FIG. 11.
Figure 13:
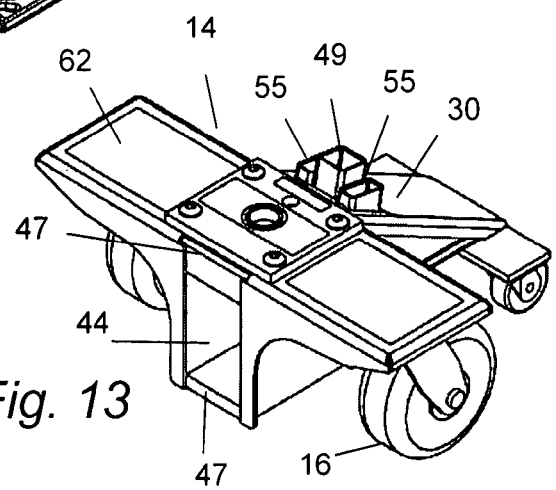
FIG. 13 depicts the device of FIG. 11 showing the slot formed in the dolly adapted for translating engagement of the lift chassis engaged to the opposing members.
Figure 14:
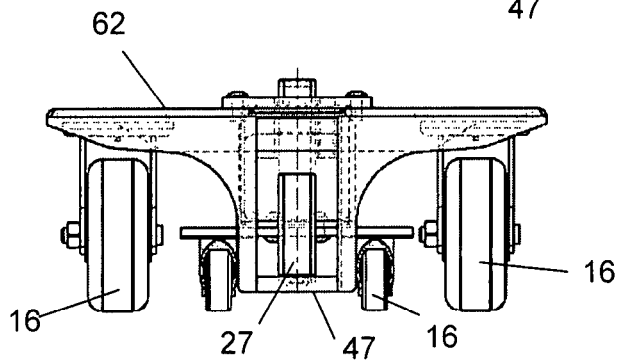
FIG. 14 depicts the device of FIG. 11 showing the elongated face projecting from the slot.
Figure 15:
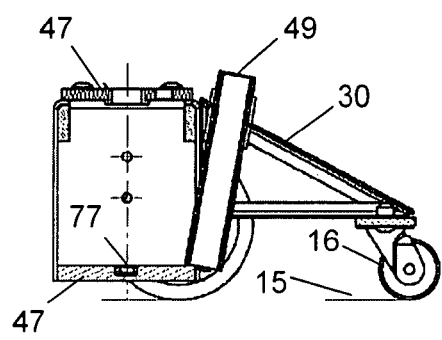
FIG. 15 is a sectional view showing the slot and the angled foot plate and handle engagement collar.
Figure 21:
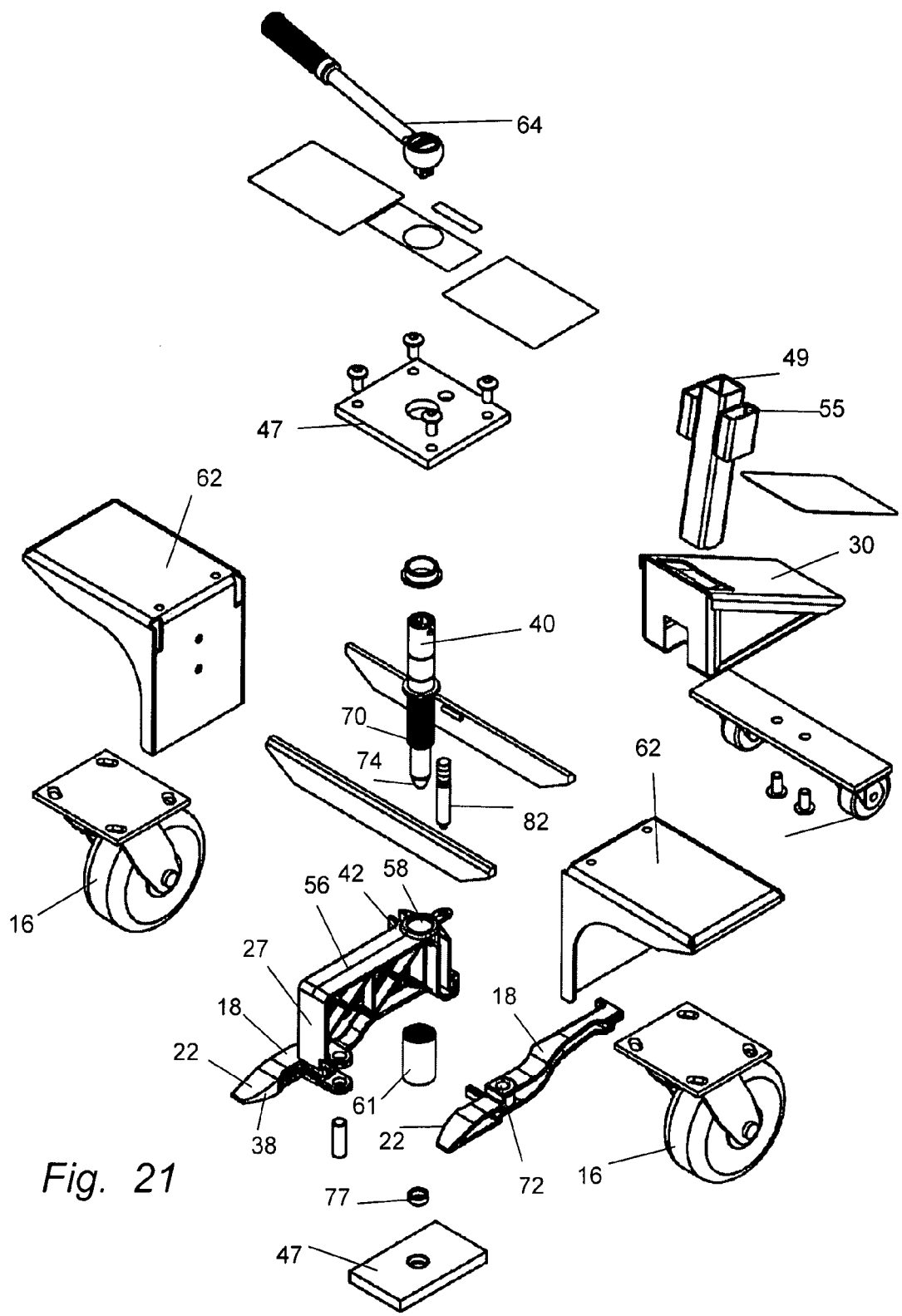
FIG. 21 shows an exploded view of a preferred mode of the device.

As noted, FIGS. 11-20 depict an especially preferred mode of the device 10 which provides all features in a single unit. In operation, the device 10 in the mode depicted in FIGS. 11-20 is especially preferred in that all important functions providing increased utility are passively provided in a single unit which also provides means for concurrent imparting of both foot and hand force to the dolly 14 without the need for a separate setting component. As shown in FIG. 11 the single unit mode of the device 10 provides the dolly 14 having the opposing members 18 extending from one side edge and an angled footplate 30 extending to an engagement with wheels 16 at a distal end of the footplate 30 on the opposite side edge. A recess provides the collar 49 adapted for engagement to the handle 48 to provide means for the user to impart a hand force toward the shelf using a foot engaged to the footplate 30 and one or more hands on the handle 48 concurrently. This allows for increased forward force when pushing the opposing members 18 under a kickplate 13.

A slot 44 formed in the dolly 14 in between two horizontal cross members 47, provides a cavity for translating engagement of the lift chassis 42 engaged to the support member 56 which provides the mount for the two opposing members 18. The planar elongated face 27, is provided along a substantially vertical leading edge of the support member portion 56, at an angle substantially parallel to the axis of the intended support posts 12, thereby providing a planar support to engage the support posts 12 shown in FIGS. 1 and 17.

FIGS. 16-20 of this second mode depict the components which operatively engage in the slot 44 to provide both a compressive and frictionally engaging means to grip the support posts 12 in a removable engagement, and a means to elevate the opposing members 18 above the floor 15 when so engaged to the post 12 to thereby elevate the shelf 11. As noted this mode of the device 10 also has passive means to maintain the opposing members 18 engaged to the post 12 at all times when the post 12 is elevated. This means to prevent disengagement of the opposing members 18 from an elevated post is especially important when lifting heavy shelves with multiple dollies 14 since a release of a dolly could cause a toppling of the shelf 11.

As shown in FIG. 16, the lift chassis 42 is adapted for translational engagement in the slot 44. An elongated cavity 58 communicating through the lift chassis 42 has a threaded sidewall 60 provided by bushing 61 inserted therein or by forming the threaded sidewall 60 directly in the cavity 58. An elongated screw member 40 is adapted at a first end communicating above the top surface 62 of the dolly 14 for engagement with a wrench or other tool 64. An annular projection 66 extending from the exterior circumference of the screw member 40, maintains it above a limiting seat 68 on a top surface of the lift chassis 42 and below the top surface 62 of the dolly 14. The taper 74 on the end of the screw member 40 rides in a bearing 77 in the surface of the lower of the two cross members 47 as shown in FIG. 17. Mating threads 70 formed along the exterior surface of the screw member 40 are adapted to engage with the threaded sidewall 60.

As can be readily understood by those skilled in the art, rotation of the screw member 40 will rotate the threads 70 which are engaged with the threads in the sidewall 60. Since taper 74 engaged in the bearing 77 maintains the screw member 40 substantially stationary, its rotation will cause the lift chassis 42, and engaged support member 56, and operatively connected members 18, to translate toward and away from the floor 15 or other support surface. The annular projection 66 serves as a means to limit vertical travel away from the floor 15. Means for rotational engagement of the connected members 18 in a scissor-like fashion, is provided by pin 72 which allows for rotation of the distal ends 23 of the members 23, to move closer when the opposite first ends of the members 18 are moved apart.

As noted, at the second end, opposite the first end of the screw member 40 is formed a taper 74 in the exterior surface 76. In addition to riding in the bearing 77 this taper is adapted in length and slant to contact one of the members 18 along a contact point 78 as a means to progressively urge that member 18 away from the lift chassis 42 thereby causing the distal ends 18 of the members 18 to approach each other. When the lift chassis 42 has been translated to its closest point to the floor 15, the contact point 78 will be moved to a position where it is closest to the center axis of the screw member 40 and thereby allowing the distal ends 23 of the members 18 to open to a released position which is a distance wider than "D" to allow the tapered edges 38 to traverse past the width of the support post 12. Once the aperture 46 is situated properly, this taper 74 thereafter provides a progressive means to urge the distal ends 23 of the moving member 18 toward each other between the released position, to the engaged position shown in FIGS. 18 and 20 where the support post 12 is engaged between the members along two sides of the aperture 46 and around two corners of the support post 12 opposite the face 27. In the released position, shown in FIG. 19 the contact point 78 can move closer to the center axis 81 of the screw member 40 thereby allowing the distal ends of the members 18 to rotate and open a distance wider than that of the support post 12 "D" shown in FIG. 18. This tapered engagement of the contact point 78 to the taper 74 thereby provides a passive means to allow spreading of the opposing members 18 during engagement to the support post 12 as the tapered top surfaces 22 are forced under the kickplate 13 and the tapered inner edges 38 are forced around the support post 12.

As noted, this allows positioning of the aperture 46 around the support post 12 properly prior to rotating the screw member 40. Thereafter with the aperture 46 surrounding the base of the support post 12, a closing arm 75 engaged to one of the members 18 will naturally close the aperture 46 when the surface of the closing arm 75 is urged against the base of the support post 12. This occurs since the end of the member 18 with the contact point 18 will freely rotate away from the taper 74 when a force is applied to the distal ends of the members 18 by the arm 75.

Once properly positioned, the user employing the tool in a first step, rotates the screw member 40. As the lift chassis 42 rises, the contact point 78 on the taper 74 progressively urges that member 18 away from the center axis 81 and thereby provides a sufficient time duration for the distal ends 23 of the opposing members 18, to rise a distance above the floor 15, and past the any extension or adjustment foot, before the inner face 38 of the members 18 at the aperture 46 engage with the exterior of the support post 12 at a second vertical position above the floor 15. It is most important to achieve this engagement in a good compressive and frictional engagement of each aperture 46 of each device 10, in the plurality employed to lift a shelf 11, at substantially the same second vertical position to keep the raised shelf 11 level, and to insure a good engagement past any extension adjustment feet. Since all of the dollies so employed would have the same taper 74 slant and taper distance, all will inherently achieve their respective engagement with a respective support post 12, at a second vertical position substantially the same distance from the floor 15. This as noted insures that the shelf 11 is lifted and maintained in a level position and that the shelf is not distorted by uneven stresses.

Once the engagement of the members 18 is achieved at the second vertical position, continued rotation of the screw member 40 will cause the threads 70 to urge the lift chassis 42 to a third vertical position, wherein the top of the lift chassis 42 contacts one or both the projection 66 and the top surface 62 thereby providing a contact for a stop. Such a contact provides a means to limit translation of the lift chassis 42 and thereby, the distance the support post 12 is elevated. Again, since all of the dollies 14 have similarly configured screw members 40, all will limit translation away from the floor 15 at substantially the same third vertical position shown in FIG. 17, this means to limit translation thereby insures that each support post 12 is elevated substantially the same distance from the floor 15.

Additionally, since the contact point 78 of the moving member 18 is maintained against the exterior surface 76 of the screw member 40 above the taper 74 whenever the support post 12 is elevated above the floor and until it is lowered by reverse rotation of the screw member 40, a means to prevent the release of the opposing members 18 from releasing the engagement to the support post 12 while in an elevated position is provided that is passive and automatic. Only when reverse rotation of the screw member 40 is provided for sufficient time to move the contact point 78 onto the taper 74 will the compressed frictional engagement to the post 12 be released. This greatly enhances safety as can be ascertained.

Finally, utility of the device 10 is enhanced by a visual positioning gauge 80 which in the current preferred mode of the device 10 is provided by a rod 82 having indicia 84 located thereon which may be visually compared to location indicia 86 positioned on the screw member 40 in positions above the top surface 62. Using the indicia 84 on the rod 82 relative to the location indicia 86, the user while rotating the screw member 40 can ascertain the relative positions of the distal ends of the members 18 and aperture 46 between the first position adjacent to the floor 15 and at the second vertical position and third vertical position. When properly pre calibrated, the indica on both components will align at the second vertical position and third vertical position to let the user know they have rotated the screw member 40 to reach these stages and to cease such rotation.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as

What is claimed is:

1. An apparatus for moving display cases supported by support posts having supporting ends positioned on a support surface, comprising:
    a dolly, said dolly having a supporting member;
    said dolly supported for rolling on said support surface by at least one wheel engaged with said dolly;
    a support post gripping component having a first member and a second member;
    said first and second members extending to respective distal ends spaced from a first side of said dolly from respective first ends which are supported by a lifting chassis;
    said lifting chassis engaged to at least one of said respective first ends, said lifting chassis in a translating engagement with said dolly in a direction of translation running substantially normal to said support surface;
    said distal ends terminating at end edges, said distal ends each having a top surface, outer edge surfaces, and having respective opposing inner edge surfaces opposite said outer edge surfaces, said inner edge surfaces forming an opening therebetween;
    said top surfaces of said distal ends of said first and second members each having a taper, said taper defining a declining angled top surface extending from a first point on said top surface adjacent to said end edges, in a declining line toward said end edges; and
    said taper defining an inclining ramp, said ramp providing means to deflect a vertical kickplate positioned above said support surface and blocking access to said opening, in a direction away from said support surface, during a positioning of said opening to said first position;
    said opening having a collapsed size and having an enlarged size wherein a distance between said inner edge surfaces is larger than said distance with said opening in said collapsed size;
    means to translate one of said respective inner edge surfaces from a first position with said opening in said enlarged size, toward the other of said inner edge surfaces, to a second position wherein said opening is in said collapsed size;
    said opening in said enlarged size being slightly larger than a diameter of said support post;

said collapsed size of said opening being substantially equal to or sightly smaller than said diameter of said support post;

means for a translation of said lifting chassis vertically toward and away from said support surface;

said opening in said enlarged size positionable to a first position with said support post within said opening, by rolling said dolly on said at least one wheel in a direction to place said support post within said opening;

said opening in said collapsed size, providing means to grip a portion of a circumference of said support post in an engagement;

a translation of said lifting chassis away from said support surface causing an actuation and a translation of said inner edge surface of one of said first or second members, to said second position moving said opening to said engagement, said translation of said lifting chassis away from said support surface with said opening in said engagement, providing means for raising said support post from a supported position with said supporting end of said support post resting on said support surface, to an elevated position with said supporting end of said support post elevated above said support surface; and whereby said support post is repositionable upon said support surface to different said supported positions, by a rolling of said dolly with said support post in said engagement.

2. The apparatus for moving display cases of claim 1 additionally comprising:

said actuation also engaging a means to prevent a release of said engagement when said support post is in said elevated position.

3. The apparatus for moving display cases of claim 2 additionally comprising:

a reversing of said translation of said lifting chassis, to a direction toward said support surface, with said support post in said elevated position, actuating said release of said engagement only when said support post reaches said supported position.

4. The apparatus for moving display cases of claim 2 wherein said means for translation of said lifting chassis vertically toward and away from said support surface comprises:

a screw member having a first end adapted for engagement to a tool to rotate it, and having a second end supported on a bearing which is supported by said dolly;

said screw member engaged to said dolly with said first end exposed and positioned at an angle substantially normal to said support surface;

said screw member having threads on an exterior circumference area, said threads configured for engagement with mating threads positioned in an axial cavity communicating through said lifting chassis; and a rotation of said screw member communicating a translation of said lifting chassis toward or away from said support surface depending on the direction of said rotation.

5. The apparatus for moving display cases of claim 2 wherein said opening additionally comprises:

said opening in said collapsed size adapted for four sided contact with a said support post having four side surfaces;

said inner edge surfaces positioned parallel to each other and for a parallel engagement with a first two of said four side surfaces;

a planar surface engaged to said dolly positioned to contact a third surface connecting said first two side surfaces and substantially perpendicular thereto;

a pair of extending edges, each extending partially across a fourth of said surfaces, parallel to said third surface, said extending edges extending perpendicular to said inner edge surfaces to distal ends of said extending edges from respective attachment points with a respective one of said inner edge surfaces; and said opening in said collapsed size contacting three of said four side surfaces and said extending edges providing a wraparound engagement over two corners of said support post opposite said third surface.

6. The apparatus for moving display cases of claim 1 wherein said means to translate one of said respective inner edge surfaces in a first position toward the other respective said inner edge surface, to a second position, comprises:

said first member and said second member engaged in a scissors-type pivotal engagement; and means to translate one of said respective first ends away from the other of said first ends, thereby moving said inner edge surfaces from said first position to said second position.

7. The apparatus for moving display cases of claim 1 wherein said means for translation of said lifting chassis vertically toward and away from said support surface comprises:

a screw member having a first end adapted for engagement to a tool to rotate it, and having a second end supported on a bearing which is supported by said dolly;

said screw member engaged to said dolly with said first end exposed and positioned at an angle substantially normal to said support surface;

said screw member having threads on an exterior circumference area, said threads configured for engagement with mating threads positioned in an axial cavity communicating through said lifting chassis; and a rotation of said screw member communicating a translation of said lifting chassis toward or away from said support surface depending on a direction of said rotation.

8. The apparatus for moving display cases of claim 1 wherein said opening additionally comprises:

said opening in said collapsed size adapted for four sided contact with a said support post having four side surfaces;

said inner edge surfaces positioned parallel to each other and for a parallel engagement with a first two of said four side surfaces;

a planar surface engaged to said dolly positioned to contact a third surface connecting said first two side surfaces and substantially perpendicular thereto;

a pair of extending edges, each extending partially across a fourth of said surfaces, parallel to said third surface, said extending edges extending perpendicular to said inner edge surfaces to distal ends of said extending edges from respective attachment points with a respective one of said inner edge surfaces; and said opening in said collapsed size contacting three of said four side surfaces and said extending edges providing a wraparound engagement over two corners of said support post opposite said third surface.

9. The apparatus for moving display cases of claim 1 additionally comprising:

a foot plate extending at a downward angle from said dolly on an opposite side from said first side; and said foot plate providing user means to impart force toward said first side of said dolly with a foot.

10. The apparatus for moving display cases of claim 1 additionally comprising:
a handle extending above said dolly;
said handle adapted for gripping by a hand of a user; and
said handle providing means to impart force toward said first side of said dolly with said hand.

11. The apparatus for moving display cases of claim 10 additionally comprising:
a foot plate extending at a downward angle from said dolly on an opposite side from said first side; and
said foot plate providing user means to impart force toward said first side of said dolly with a foot concurrently with said force imparted with said hand on said handle.

12. The apparatus for moving display cases of claim 1 additionally comprising:
at least one pair of said dollies;
at least one connector bar having two ends; and
each of said dollies having means for engagement of one of said two ends of said connector bar, whereby said connector bar is engageable between said pair of dollies.

13. An apparatus for moving display cases supported by support posts having supporting ends positioned on a support surface, comprising:
a dolly, said dolly having a supporting member;
said dolly supported for rolling on said support surface by at least one wheel engaged with said dolly;
a support post gripping component having a first member and a second member;
said first and second members extending to respective distal ends spaced from a first side of said dolly from respective first ends which are supported by a lifting chassis;
said lifting chassis engaged to at least one of said respective first ends, said lifting chassis in a translating engagement with said dolly in a direction of translation running substantially normal to said support surface;
said distal ends terminating at end edges, said distal ends each having a top surface, outer edge surfaces, and having respective opposing inner edge surfaces opposite said outer edge surfaces, said inner edge surfaces forming an opening therebetween;
said opening having a collapsed size, and having an enlarged size wherein a distance between said inner edge surfaces is larger than said distance with said opening in said collapsed size;
means to translate one of said respective inner edge surfaces from a first position with said opening in said enlarged size, toward the other of said inner edge surfaces to a second position, wherein said opening is in said collapsed size;
said opening in said enlarged size being slightly larger than a diameter of said support post;
said collapsed size of said opening being substantially equal to or sightly smaller than said diameter of said support post;
means for a translation of said lifting chassis vertically toward and away from said support surface;
said opening in said enlarged size positionable to a first position with said support post within said opening, by rolling said dolly on said at least one wheel in a direction to place said support post within said opening;
said opening in said collapsed size, providing means to grip a portion of a circumference of said support post in an engagement; and a translation of said lifting chassis away from said support surface causing an actuation and a translation of said inner edge surface of one of said first or second members, to said second position moving said opening to said engagement;
said translation of said lifting chassis away from said support surface with said opening in said engagement, providing means for raising said support post from a supported position with said supporting end of said support post resting on said support surface, to an elevated position with said supporting end of said support post elevated above said support surface;
a portion of each said inner edge surfaces between said opening and said end edges, having a curve;
each said curve being toward a respective outer edge surface of each of said first and second members;
a declining gap formed between said curves from a widest point adjacent to said end edges to a narrowest point adjacent to said opening;
said declining gap providing means to funnel said support post to said first position within said opening; and
whereby said support post is repositionable upon said support surface to different said supported positions, by a rolling of said dolly with said support post in said engagement.

14. The apparatus for moving display cases of claim 13 additionally comprising:
said actuation also engaging a means to prevent a release of said engagement when said support post is in said elevated position.

15. The apparatus for moving display cases of claim 14 additionally comprising:
a reversing of said translation of said lifting chassis, to a direction toward said support surface, with said support post in said elevated position, actuating said release of said engagement only when said support post reaches said supported position.

16. The apparatus for moving display cases of claim 15 additionally comprising:
said top surfaces of said distal ends of said first and second members each having a taper, said taper defining a declining angled top surface extending from a first point on said top surface adjacent to said end edges, in a declining line toward said end edges; and
said taper defining an inclining ramp, said ramp providing means to deflect a vertical kickplate positioned above said support surface and in-between said support post and said opening, in a direction away from said support surface, during a positioning of said opening to said first position.

17. The apparatus for moving display cases of claim 14 additionally comprising:
said top surfaces of said distal ends of said first and second members each having a taper, said taper defining a declining angled top surface extending from a first point on said top surface adjacent to said end edges, in a declining line toward said end edges; and
said taper defining an inclining ramp, said ramp providing means to deflect a vertical kickplate positioned above said support surface and in-between said support post and said opening, in a direction away from said support surface, during a positioning of said opening to said first position.

18. The apparatus for moving display cases of claim 13 additionally comprising:
said top surfaces of said distal ends of said first and second members each having a taper, said taper defining a declining angled top surface extending from a first point on said top surface adjacent to said end edges, in a declining line toward said end edges; and said taper defining an inclining ramp, said ramp providing means to deflect a vertical kickplate positioned above said support surface and in-between said support post and blocking access to said opening, in a direction away from said support surface, during a positioning of said opening to said first position.

19. The apparatus for moving display cases of claim 13 wherein said means to translate one of said respective inner edge surfaces in a first position toward the other of said respective inner edge surfaces, to a second position, comprises:

said first member and said second member engaged in a scissors-type pivotal engagement; and means to translate one of said respective first ends away from the other of said first ends, thereby moving said inner edge surfaces from said first position to said second position.

20. The apparatus for moving display cases of claim 13 additionally comprising:

at least one pair of said dollies;

at least one connector bar having two ends; and each of said dollies having means for engagement of one of said two ends of said connector bar, whereby said connector bar is engageable between said pair of dollies.

21. An apparatus for moving display cases supported by support posts having supporting ends positioned on a support surface, comprising:

a dolly, said dolly having a supporting member;

said dolly supported for rolling on said support surface by at least one wheel engaged with said dolly;

a support post gripping component having a first member and a second member;

said first and second members extending to respective distal ends spaced from a first side of said dolly from respective first ends which are supported by a lifting chassis;

said lifting chassis engaged to at least one of said respective first ends, said lifting chassis in a translating engagement with said dolly in a direction of translation running substantially normal to said support surface;

said distal ends terminating at end edges, said distal ends each having a top surface, outer edge surfaces, and having respective opposing inner edge surfaces opposite said outer edge surfaces, said inner edge surfaces forming an opening therebetween;

said opening having a collapsed size, and having an enlarged size wherein a distance between said inner edge surfaces is larger than said distance with said opening in said collapsed size;

said first member and said second member engaged in a scissors-type pivotal engagement, said pivotal engagement providing means to translate one of said respective inner edge surfaces from a first position, with said opening in said enlarged size, toward the other of said inner edge surfaces to a second position, wherein said opening is in said collapsed size;

means to translate one of said respective first ends, of one of said first member and said second member away from the other of said first ends, thereby moving said edge surfaces from said first position to said second position;

said opening in said enlarged size being slightly larger than a diameter of said support post;

said collapsed size of said opening being substantially equal to or sightly smaller than said diameter of said support post;

a screw member having a first end adapted for engagement to a tool to rotate it, and having a second end supported on a bearing which is supported by said dolly, said screw member having an exterior surface and having a center axis therethrough;

said screw member engaged to said dolly with said first end exposed and positioned at an angle substantially normal to said support surface;

said screw member having threads on a central portion of said exterior surface, said threads configured for engagement with mating threads positioned in an axial cavity communicating through said lifting chassis;

a rotation of said screw member communicating a translation of said lifting chassis toward or away from said support surface depending on the direction of said rotation;

a taper formed at said second end of said screw member for a distance, said taper progressively narrowing said exterior surface along said distance, from a wider point adjacent to said threads to a narrower point adjacent to said bearing;

said means to translate one of said respective first ends away from the other of said first ends, provided by an inner edge point of one of said first ends engaging upon said exterior surface;

said translation of said lifting chassis away from said support surface to move said support post to said elevated position, thereby moving said inner edge point from a position contacting said surface adjacent to said narrower point of said exterior surface to a position in contact with said wider point, thereby moving said inner edge surfaces from said first position to said second position; and said inner edge point remaining in contact with said wider point for the duration that said support post is in said elevated position, thereby providing said means to prevent a release of said engagement when said support post is in said elevated position;

said opening in said enlarged size positionable to a first position with said support post within said opening, by rolling said dolly on said at least one wheel in a direction to place said support post within said opening;

said opening in said collapsed size, providing means to grip a portion of a circumference of said support post in an engagement;

a translation of said lifting chassis away from said support surface causing an actuation and a translation of said inner edge surface of one of said first or second members, to said second position moving said opening to said engagement;

said translation of said lifting chassis away from said support surface with said opening in said engagement, providing means for raising said support post from a supported position with said supporting end of said support post resting on said support surface, to an elevated position with said supporting end of said support post elevated above said support surface; and whereby said support post is repositionable upon said support surface to different said supported positions, by a rolling of said dolly with said support post in said engagement.

22. The apparatus for moving display cases of claim 21 additionally comprising:

said top surfaces of said distal ends of said first and second members each having an inclining taper, said inclining taper defining a declining angled top surface extending from a first point on said top surface adjacent to said end edges, in a declining line toward said end edges; and said inclining taper defining an inclining ramp, said ramp providing means to deflect a vertical kickplate positioned above said support surface and in-between said support post and said opening, in a direction away from said support surface, during a positioning of said opening to said first position.

23. The apparatus for moving display cases of claim 21 wherein said opening additionally comprises:

said opening in said collapsed size adapted for four sided contact with a said support post having four side surfaces;

said inner edge surfaces positioned parallel to each other and for a parallel engagement with a first two of said four side surfaces;

a planar surface engaged to said dolly positioned to contact a third surface connecting said first two side surfaces and substantially perpendicular thereto;

a pair of extending edges, each extending partially across a fourth of said surfaces, parallel to said third surface, said extending inner edges extending perpendicular to said edge surfaces to distal ends of said extending edges from respective attachment points with a respective one of said inner edge surfaces; and said opening in said collapsed size contacting three of said four side surfaces and said extending edges providing a wraparound engagement over two corners of said support post opposite said third surface.

24. The apparatus for moving display cases of claim 23 additionally comprising:

said top surfaces of said distal ends of said first and second members each having an inclining taper, said inclining taper defining a declining angled top surface extending from a first point on said top surface adjacent to said end edges, in a declining line toward said end edges; and said inclining taper defining an inclining ramp, said ramp providing means to deflect a vertical kickplate positioned above said support surface and in-between said support post and said opening, in a direction away from said support surface, during a positioning of said opening to said first position.

25. The apparatus for moving display cases of claim 23 additionally comprising:

at least one pair of said dollies;

at least one connector bar having two ends; and each of said dollies having means for engagement of one of said two ends of said connector bar, whereby said connector bar is engageable between said pair of dollies.

26. The apparatus for moving display cases of claim 21 additionally comprising:

at least one pair of said dollies;

at least one connector bar having two ends; and each of said dollies having means for engagement of one of said two ends of said connector bar, whereby said connector bar is engageable between said pair of dollies.

* * * * *